United States Patent
Benton

[15] 3,657,981
[45] Apr. 25, 1972

[54] DIRECT ORTHOSCOPIC STEREO PANORAMAGRAM CAMERA

[72] Inventor: Stephen A. Benton, Cambridge, Mass.
[73] Assignee: Polaroid Corporation, Cambridge, Mass.
[22] Filed: Apr. 9, 1970
[21] Appl. No.: 26,909

[52] U.S. Cl. .................................................95/18 P
[51] Int. Cl. ......................................................G03b 35/08
[58] Field of Search.........................95/18 R, 18 P; 350/131

[56] References Cited

UNITED STATES PATENTS

| | | | |
|---|---|---|---|
| 2,562,077 | 7/1951 | Winnek | 95/18 P |
| 3,200,702 | 8/1965 | Giordano | 350/131 X |

FOREIGN PATENTS OR APPLICATIONS

| | | | |
|---|---|---|---|
| 493,220 | 5/1953 | Canada | 95/18 P |

OTHER PUBLICATIONS

"One Step Holocoder" by A. W. Lohmann IBM Technical Disclosure Bulletin, Vol 10, No. 10, Mar. 1968.

*Primary Examiner*—Samuel S. Matthews
*Assistant Examiner*—Richard L. Moses
*Attorney*—Brown and Mikulka, William D. Roberson and Frederick H. Brustman

[57] ABSTRACT

A camera for making orthoscopic stereo panoramagrams is disclosed. Recorded stereo images can be viewed directly without having to be corrected for pseudoscopy in a subsequent operation. A segmented composite lens is used in the optical imaging system to obtain a wide aperture while avoiding difficulties associated with wide aperture moderate focal length lenses. In addition, a second retroreflecting screen is used to double the photo efficiency of the camera.

19 Claims, 4 Drawing Figures

INVENTOR.
STEPHEN A. BENTON
BY Brown and Mikulka
and
Frederick H. Braustman
ATTORNEYS

DIRECT ORTHOSCOPIC STEREO PANORAMAGRAM CAMERA

BACKGROUND

This invention is concerned with stereo panoramagrams which may be described as a stereoscopic recording having more than two stereo related images of a subject. In particular, this invention is concerned with stereo panoramagrams which can be viewed by reflected light, e.g., a photographic print. Recorded on the print is an array of dissected images. Each image is a view of the subject from a different angle. By projecting reflected light from each image element at appropriate angles angular perspective can be restored for a viewer. A binocular viewer perceives the image(s) stereoscopically.

Three dimensional perception of such a recording, that is, a visual sensation of depth in the record, is related to each eye seeing a slightly different image and having to converge at a specific angle to fuse details common to the several images. By photographing many views, each at a slightly different angle, a continuous panorama can be created. If a sufficiently large number of angularly different images are present, the panorama is stereoscopic.

One known method for making such a recording is to use a lens having an aperture wider than normal eye spacing. In the central image plane of the lens is placed a photographic emulsion. Adjacent to the emulsion is a screen of lenticules. The lenticules dissect the panorama of images arriving in the central image plane. An interspersed array of image elements is formed of the incident panorama. To reconstruct the stereo panoramic image, the lenticular screen is placed in registration with the photographic array of image elements. Reflected light from the photograph is angularly distributed by the lenticules.

A serious drawback of the system described is pseudoscopy in the reconstructed image. Pseudoscopy is stereoscopic reversal wherein an observer moving leftward sees the image rotate in the same direction even faster. In consequence, a left moving observer sees more of the right side of the subject rather than the left as he would in the real, orthoscopic, world. Pseudoscopy has been corrected by a second photographic recording step. In the second recording step, the pseudoscopic image of the first step serves as the subject. The second image is orthoscopic because it is also stereoscopically reversed from its subject. In the second instance the reversal is from incorrect to correct stereoscopy.

In stereo panoramagram cameras with which this invention is concerned, pseudoscopy is corrected optically as an integral function of the optical system. Only an orthoscopic image is recorded. In the central image plane of the main taking lens, a retro-reflecting screen is used in place of photographic recording means. The retro-reflected image is pseudoscopic when viewed. It is directed through another lens system which performs the necessary inversion to orthoscopy. Only then is the image recorded using, for example, a lenticular screen and photographic emulsion. Thusly, an orthoscopic stereo panoramagram image can be viewed from the first, and only, recording made using the orthoscopic stereo panoramagram camera with which this invention is concerned.

Wide aperture lenses having short or moderate focal lengths for use in these cameras are difficult to manufacture with desirable corrections for optical aberrations. It is desirable for the focal length to be short so a compact camera can be made. Simultaneously, the aperture should be at least 60 millimeters wide to permit adequate stereo effect. It must be still wider if panoramagram effects are desired.

In direct orthoscopic stereo cameras a semi-transparent mirror is used to intercept retro-reflected light and direct it to the secondary lens and stereo recording means. Unfortunately, semi-transparent mirrors also reflect light incident from the objective preventing it from reaching the retro-reflector. This is a fundamental limit on the camera's efficient use of image-forming light gathered by the primary objective lens.

It is an object of this invention to provide a lens for a stereo panoramagram camera having a usefully compact focal length and a wide effective aperture which is comparatively free of optical aberrations.

A further object of this invention is a direct orthoscopic stereo panoramagram camera which more effectively uses light gathered by the primary lens.

To further these objects, a composite segmented lens system is provided. The segments are lenses having small circular aperture and a desirably short focal length. Several segments are used together to form an aperture of desired width. Light prevented from reaching the retro-reflector by reflection first from the semi-transparent mirror is utilized in forming the final stereo image. To accomplish this, a second retro-reflector is located conjugate to the first retro-reflector with respect to the semi-transparent mirror.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein.

Figure 1:
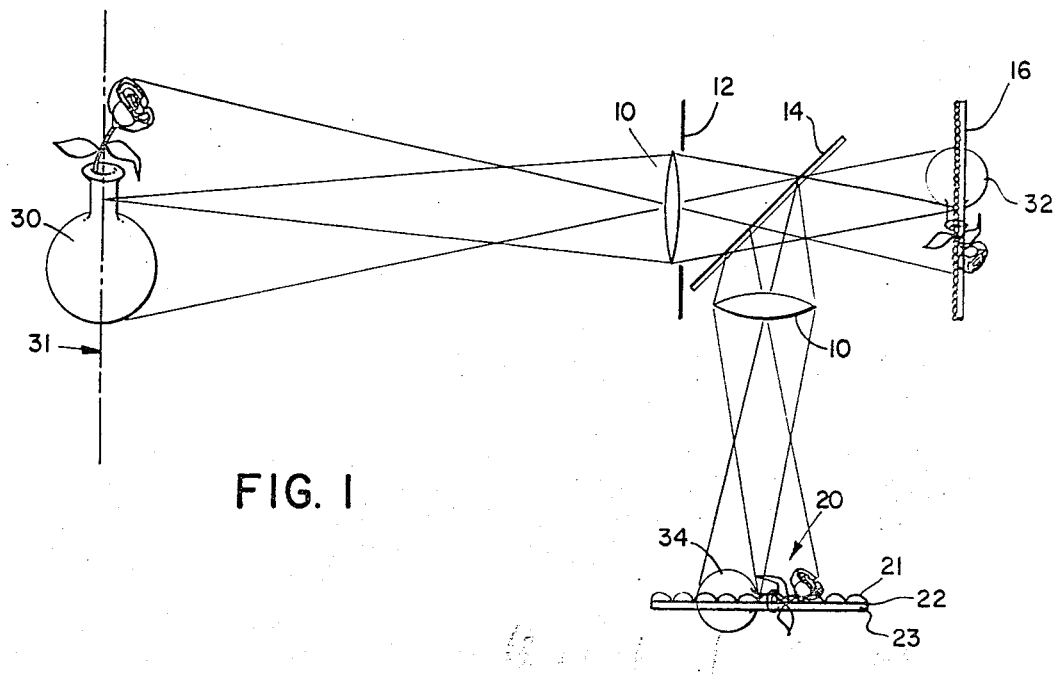
FIG. 1 illustrates an optical arrangement useful in a direct orthoscopic stereo panoramagram camera.

A schematic arrangement of components useful in making one-step orthoscopic stereo panoramagrams is illustrated in FIG. 1. The principal components of such a camera are a primary taking lens 10 having an aperture 12 wider than interocular spacing and a height of perhaps 10 to 20 millimeters. A retro-reflecting screen 16 is placed in the image space of lens 10. Between lens 10 and retro-reflecting screen 16 is semi-transparent mirror 14 positioned to direct light from retro-reflector 16 laterally. Secondary imaging lens 18 is positioned to intercept light rays from retro-reflector 16 after reflection by semi-transparent mirror 14. Secondary lens 18 can be spaced a distance from retro-reflector 16 equal to the distance between primary lens 10 and retro-reflector 16. Stereoscopic recording means 20 is placed in the path of light rays deflected by beam splitter 14 and refracted by secondary lens 18. Stereoscopic recording means 20 may comprise a transparent lenticular sheet 21, photo-sensitive emulsion 22, and substrate 23. It is convenient in an orthoscopic stereo panoramagram camera to place recording means 20 a distance from secondary lens 18 which corresponds to comfortable viewing or reading distance for a person of normal vision.

Secondary lens 18 is selected so that retro-reflecting screen 16 and stereo recording means 20 lie in conjugate planes. While such an arrangement is not mandatory for the functioning of a direct orthoscopic stereo panoramagram camera, it makes optimum use of the resolution capabilities of retro-reflecting screen 16 and stereoscopic recording means 20. Retro-reflecting screen 16 and stereo recording means 20 have finite limits on their resolution capabilities. It has been demonstrated elsewhere that the arrangement described is least demanding in terms of resolution capabilities.

A lens forms three-dimensional images of three-dimensional subjects. Lens 10 is provided with focusing means such that it can form a three-dimensional image of a subject in the vicinity of retro-reflecting screen 16. In FIG. 1, primary lens 10 forms an image 32 of subject 30. Primary lens 10 is preferably focused in such a manner that central plane 31 of subject 30 is co-planar with retro-reflecting screen 16. In this manner image 32 of subject 30 is caused to straddle retro-reflecting screen 16. This arrangement is desirable because it makes optimum use of the finite resolution capability of retro-reflecting screen 16.

Light rays forming image 32 are reflected back on themselves by retro-reflecting screen 16. A substantial portion of retro-reflected light rays are diverted by beam splitter 14 to secondary lens 18 which forms an image 34 of image 32 onto stereo recording means 20.

It should be understood that if stereo recording means 20 were placed directly in the path of light rays from subject 30 at the position occupied by retro-reflector 16, the image recorded on stereo recording means 20 would be pseudoscopic when viewed in light reflected from the recording means. Image 34 stored on stereo recording means 20 appears orthoscopic when viewed in reflected light because it is formed from a pseudoscopic subject, that is, retro-reflected image 32.

A problem in making a one-step orthoscopic stereo panoramagram camera is the necessity of producing primary lens 10 and secondary lens 18 with very large apertures. Apertures for lenses 10 and 18 should be at least as wide as the normal interocular spacing and preferably wider. A width less than that does not result in useful stereo effects for a person viewing the image recording. In order to provide panoramagram effects as well as stereoscopic effects, apertures on the order of 150 millimeters are desirable.

It is not necessary that the lenses have circular apertures of that size. Apertures having a height of only 10 to 20 millimeters are quite feasible if they possess the desired width. A lens having an aperture of 150 millimeters is quite wide and difficult to manufacture with a focal length useful in a camera of reasonably compact size. If the focal length of a large aperture lens is made shorter, it becomes difficult and expensive to provide the lens with the necessary optical corrections to form an image of useful quality.

Another difficulty experienced with direct orthoscopic stereo panoramagram cameras is the inefficiency introduced by semi-transparent mirror 14. In the old two-step panoramagram process semi-transparent mirror 14 is not used. Pseudoscopic images are corrected in a second separate reversal process. In the stereo panoramagram camera of this invention, pseudoscopy is corrected by an optical system which yields a stereo correct recording. The separate reversal process is eliminated. A large amount of light which would otherwise be used in the image-forming process is not utilized. Light entering from subject 30 and passing through primary taking lens 10 is incident on semi-transparent mirror 14 which deflects half out of the optical path. Only half the light received reaches retro-reflecting screen 16 forming image 32. Half of that passes through the beam splitter 14 after retro-reflection and leave the camera. One-quarter of the light received by the primary taking lens 10 finally reaches stereo recording means 20.

The improved orthoscopic stereo panoramagram camera of this invention has a composite segmented lens which provides a net effective aperture width of desirable dimensions. Simple optical corrections associated with lenses of smaller aperture are sufficient despite the large aperture width. The improved camera of this invention also has means for increasing the effective utilization of image-forming light entering it.

Figure 2:
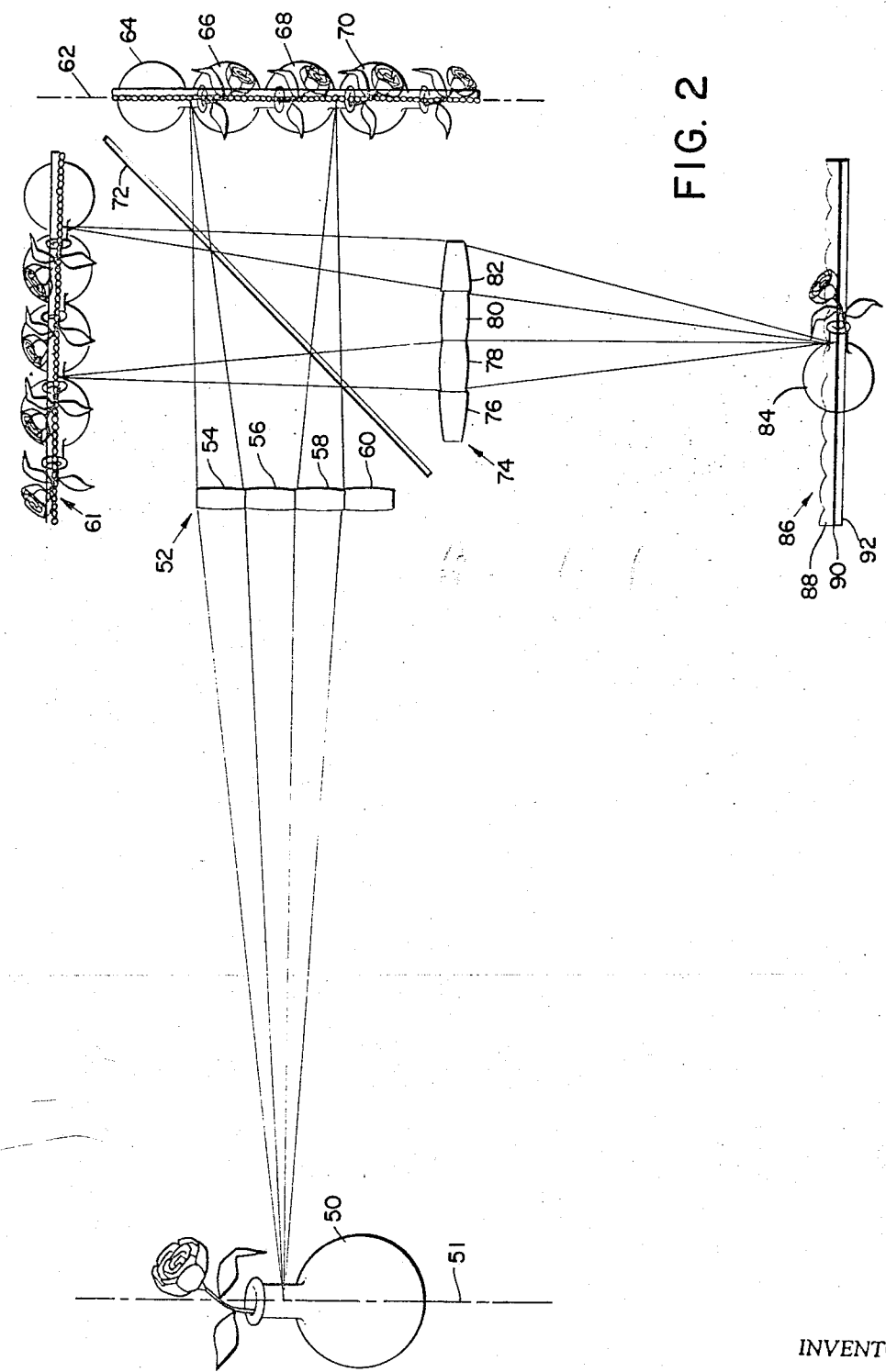
FIG. 2 illustrates an optical arrangement of a modified direct orthoscopic stereo panoramagram camera.

Refer now to FIG. 2 wherein a schematic illustration of the improved direct orthoscopic stereo panoramagram camera of the invention is shown. The subject 50 is imaged by segmented composite lens 52 onto retro-reflecting screen 62. Primary lens 52 is focusable so central plane 51 of subject 50 can be made conjugate with the plane of retro-reflective screen 62. Semi-transparent mirror 72 is positioned to laterally divert light rays coming from retro-reflector 62. Light rays directly incident on semi-transparent mirror 72 from subject 50 are partially diverted. Direct light rays diverted by semi-transparent mirror 72 are also image forming having been refracted by composite lens 52. A second retro-reflecting screen 61 is placed symmetrical with respect to retro-reflecting screen 62 about semi-transparent mirror 72. Retro-reflecting screen 61 functions in the same manner as retro-reflecting screen 62. Retro-reflecting screens 61, 62 reflect equal amounts of light energy towards secondary lens 74. One can now appreciate that using a second retro-reflecting screen 61 doubles the light energy reaching secondary lens 74. Light rays from retro-reflecting screens 61, 62 reach secondary lens 74 in registration with one another. Alignments between images formed from the retro-reflected light rays and recombined by semi-transparent mirror 72 is an essential of retro-reflection. Secondary lens 74 is also a segmented composite lens. It has a specific relation to primary segmented composite lens 52. The relation is described below.

Optical path lengths between primary lens 52 and retro-reflectors 61, 62 are substantially equal. Secondary lens 74 is spaced a distance from semi-transparent mirror 72 so the optical path length from it to either retro-reflecting screen 61 or 62 equals the distance between primary lens 52 and retro-reflectors 61, 62. The locus of all retro-reflected light rays in the system have their smallest cross section at this distance from retro-reflecting screens 61, 62. Secondary lens 74 can have its smallest aperture at this location. Further, at the plane selected for secondary lens 74, retro-reflected light rays are spatially separated into zones related to the segment of primary lens 52 through which they passed on entering the stereo camera.

Stereoscopic recording means 86 comprising transparent lenticular surface 88, photosensitive emulsion 90, and substrate 92 is placed at a distance from secondary lens 74 which approximates the most comfortable viewing distance for normal vision.

The focal length of secondary segmented composite lens 74 is selected so retro-reflectors 61, 62 lie in conjugate planes with respect to stereo recording means 86. As above, the reason for this arrangement is to reduce resolution requirements for retro-reflecting screens 61, 62 and stereo recording means 86. Optimum use is made of resolution capabilities found in retro-reflecting screens 61, 62 and stereo recording means 86.

Figure 3:
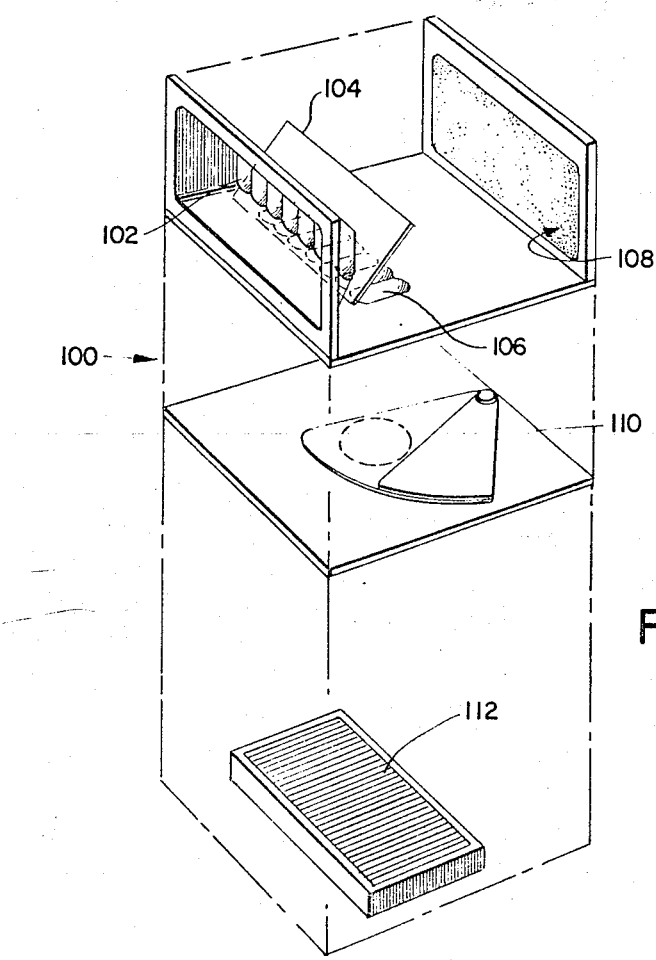
FIG. 3 illustrates a perspective view of the arrangement of components in the modified direct orthoscopic stereo panoramagram camera.

Primary lens 52 is a composite made from lens segments 54, 56, 58, 60. Lens segments 54, 56, 58, 60 are laterally spaced adjacent to one another so the sum of their apertures is equal to the necessary large aperture width associated with stereo panoramagram cameras. The height of the aperture is approximately equal to the height of an individual lens segment aperture. FIG. 3 provides another view of the arrangement for primary lens 52 and secondary lens 74 wherein they are designated 102 and 106, respectively. Referring back to FIG. 2, one can see that each lens segment 54–60 forms a separate image 64–70 of subject 50.

Any number of segments can be used in primary lens 52. The maximum useful number is determined by the resolution of retro-reflecting screens 61, 62 and/or the resolution of the stereo recording means 86. Presuming that retro-reflectors 61, 62 can be made with much higher resolution than stereo recording means 86, which is the practical case, stereo recording means 86 determines the maximum useful number of lens segments for primary lens 52.

The maximum number of segments useful in fabricating primary lens 52 is equal to the resolution of photographic layer 90, expressed in line pairs per millimeter, divided by the pitch of lenticular sheet 88, expressed in millimeters. Lenticular spacing for stereo recording means 86 is usually determined by aesthetic considerations. It is desirable to have small closely spaced lenticules so they are not noticeable. Resolution of photosensitive layer 90 is determined by considerations such as the fineness of detail to be recorded, photographic speed of the emulsion, and other factors understood by those in the art.

A number of segments, not exceeding the maximum useful number, are assembled together to form primary lens 52. One means for assembling them is to cut chordal sections from the lenses so that they can be laterally spaced together as illustrated in FIG. 3. This spacing arrangement of FIG. 3 can provide an almost continuous aperture of the necessary width and nearly uniform height throughout its width. It is possible in practicing this invention to form primary lens 52 from a series of segments which are not adjacent to one another.

FIG. 3 illustrates a camera configured in accordance with the invention. The camera is formed having a housing 100 supporting a segmented primary lens 102. A semi-transparent mirror 104 is located behind it and above segmented secondary lens 106. The optic axes of lenses 102, 106 are at right angles, semi-transparent mirror 104 being located at the intersection of the axes bisecting the angle between them. A retro-reflecting screen 108 reverses the propagation direction of light rays incident thereon due to refraction by lens 102. A portion of the light rays retro-reflected by screen 108 are reflected by semi-transparent mirror 104 to secondary lens 106. Secondary lens 106 refracts the plurality of images formed by primary lens 102 into a single or composite stereoscopic image at an exposure station supporting stereo recording means 112. A shutter 110 is located between secondary lens 106 and stereo recording means 112 to provide exposure control.

Refer again to FIG. 2. As noted above, segments 54–60 of primary lens 52 form a series of images 64–70. Primary lens 52 is focused so they have their central planes correspond to the plane of the retro-reflector 62. The following description applies, with minor changes in sequence, to light directed by semi-transparent mirror 72 to retro-reflector 61 as well as light passed by semi-transparent mirror 72 to retro-reflector 62. Only certain light rays passing through segments 54, 58 of primary lens 52 and segments 78, 82 of secondary lens 74 are shown to avoid confusion. Light rays forming images 64–70 are retro-reflected by screen 62. Semi-transparent mirror 72 diverts them laterally to secondary lens 74. Image-forming light rays retro-reflected on themselves arrive at a plane where the locus of their intersections with the plane has a minimum cross-section. The minimum cross-section corresponds to the aperture of primary lens 52. Secondary lens 74 is located in this position. Segments 76, 78, 80, 82 of secondary lens 74 desirably have apertures corresponding to the incremental apertures formed at the locus of all light rays in the plane of secondary lens 72. Thus, light rays refracted by segment 54 to form image 64 and retro-reflected by screen 62 all pass through the aperture of individual segment 82 whose aperture corresponds to the aperture of segment 54 in primary lens 52. In a similar manner, light rays forming image 68 pass through the aperture of segment 78, etc. By properly constructing secondary lens 74 from segments 76, 78, 80, 82 made appropriately asymmetrical with respect to their individual optic axes the series of images 64–70 can be fused into a single image 84. Secondary lens 74 has a focal length appropriate to cause the central plane of image 84 to fall on the plane of stereo recording means 86.

Focal length of a segmented composite lens such as primary lens 52 or secondary lens 74 is the focal length of the individual lens segments. Generally, all segments in a given composite lens have the same focal length. It should be noted that the segments have apertures considerably smaller than the full stereo system aperture width. Correcting the individual segments to a desired level of optical performance is simpler than correcting a normal lens of similar focal length but having an aperture equal to the full width of the stereo aperture.

Figure 4:
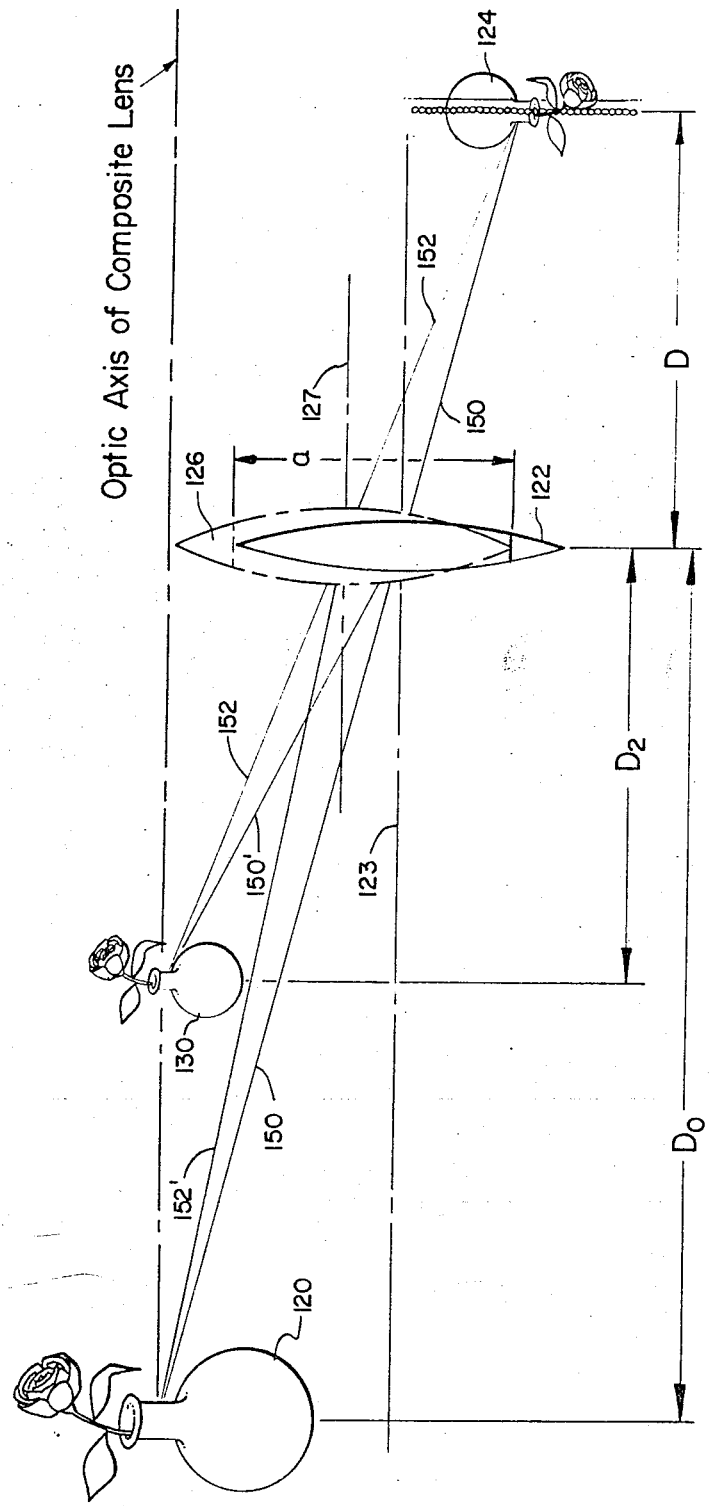
FIG. 4 illustrates a graphic method for determining the relation between primary and secondary lenses.

Reference should now be had to FIG. 4. In determining the relation to be maintained between lens segments of the primary lens and lens segments incorporated in the secondary lens, it is appropriate to first determine the desired magnification between subject 120 and final stereo viewable image 130. Lens 122 represents a segment of the primary taking lens array in a stereo panoramagram camera according to this invention. Lens 122 forms retro-reflected image 124 of subject 120. Magnification of image 124 is equal to $D/D_0$. In accord with the description above, image 124 preferably has its central plane on retro-reflector 125. Lens 126 represents a segment of the secondary lens array. It is spaced a distance D from retro-reflected image 124 for reasons set forth above. Lens 126 forms image 130 to be stereo recorded using image 124 as the subject. Stereo recorded image 130 is formed having its central plane a distance $D_i$ from lens 126. Stereo recording means (not shown) is positioned in the central plane of image 130. As noted above, it is desirable for distance $D_i$ to be approximately the viewing distance found comfortable for most observers in normal reading situations. Magnification of image 130 relative to image 124 is $D_i/D$. The magnification of final image 130, relative to subject 120, is the product of the magnification for each imaging step: $(D/D_0) \times (D_i/D)$ which is simply equal to $D_i/D_0$.

Lens 122 represents any segment of the primary lens. Optic axis 123 of lens 122 may, as a result, be located at any position along the central plane of the primary lens. In practice, the location of lens 122 would be determined by the number of segments used to form the primary lens and how closely spaced they are to be.

In determining the useful aperture of lens 122 and the relation of the corresponding lens segment 126 in the secondary lens, a chief ray 150 is drawn from a point on subject 120 to its corresponding point in image 124 through the center of lens 122. It should be understood that a pencil of rays will emanate from the selected point in subject 120 and be refracted by lens 122 to the conjugate point in image 124.

The central plane of the secondary lens is conjugate to the primary lens' central plane with respect to retro-reflector 125. In FIG. 4, in which the semi-transparent mirror has been omitted for clarity, this is denoted by showing them on the same transverse axis. To determine the location, in the central plane of the secondary lens, at which to place the optic axis 127 of lens 126, a ray 152 is drawn from the image point where ray 150 crosses the central plane of image 124 to the corresponding point in image 130. Ray 152 represents a chief ray between retro-reflected image 124 and stereo recorded image 130.

Light ray 152' emanates from a point on subject 120. It is refracted by lens 122 to the conjugate point in image 124. A retro-reflecting screen at the central plane of image 124 reverses the propagation direction of ray 152'. Reverse propagating ray 152 is diverted by a semi-transparent mirror between the primary lens and retro-reflector 125 (not shown) to lens 126 which refracts it to the conjugate point in image 130.

It should be understood that the useful portions of the apertures of lenses 122 and 126 in the primary and secondary lens arrays are those portions of their apertures which are co-extensive denoted "a" as shown in the construction method illustrated in FIG. 4. In practice, the useful aperture for each lens might be smaller due to practical mechanical considerations in the construction of the camera and lens. In situations where maximum light collection is desired, segments could be cut from lenses 122, 126 representing the co-extensive portions of their apertures. The remainder can be discarded and another lens segment designed in the same manner can be placed adjacent the previous segment. In this manner, a continuous wide aperture can be formed. Masking elements might be usefully employed where segments are joined to block non-image-forming light rays.

All rays emanating from a point on subject 120 which pass through the useful aperture of lens 122 are retro-reflected and diverted by the semi-transparent mirror (not shown) to lens segment 126. These rays pass through the useful portion of the aperture of lens 126, too, which refracts them into image 130. It can be seen in FIG. 4 that the useful apertures of lenses 122 and 126 are asymmetric to their respective optic axes 123 and 127. In consequence of this asymmetry, lens segments have a bending effect on the bundles of rays passing therethrough. The bending effect is best illustrated in FIG. 2 where it is seen that secondary lens array 74 has sufficient bending in its individual segments 76–78 to result in separate images 64–70 being coincident and forming a single image 84.

The procedure outlined above for determining the optic axis location of the secondary lens segment corresponding to the primary lens segment is repeated for each segment in the primary lens. It should be noted that the method for determining the useful portion of the aperture of the lens segments to be employed is independent of the focal length of the aperture or its distance from the lens array's central optic axes. By applying the method to each segment in the primary lens array corresponding segment for the secondary lens array can be determined.

Since certain changes may be made in the above apparatus without departing from the scope of the invention herein involved, it is intended that all matter contained in the above description or shown in the accompanying drawings shall be interpreted as illustrative and not in a limiting sense.

WHAT IS CLAIMED IS:

1. A camera for making a direct orthoscopic stereo panoramagram of a photographic subject comprising in combination: a retro-reflecting surface;
   primary lens means for forming at said retro-reflecting surface a plurality of stereoscopically related images of said subject each said image representing a different stereoscopic aspect thereof;
   semi-transparent reflecting means positioned intermediate said primary lens means and said retro-reflecting surface for reflecting light from said plurality of images formed at said retro-reflecting surface toward an exposure station;
   secondary lens means intermediate said reflecting means and said exposure station for refracting said reflected plurality of images into a composite stereoscopic image thereof at said exposure station;
   means for supporting a stereo image recording material at said exposure station; and
   means for regulating the exposure of said stereo recording material.

2. The camera of claim 1 wherein said primary lens means comprises more than two lenses each associated with an aperture of less than a predetermined size, said lenses being positioned in an array spaced so the total width of said array is equal to said predetermined size.

3. The camera of claim 2 wherein said lenses are positioned adjacent to each other.

4. The camera of claim 1 wherein said primary and secondary lens means have equal apertures at least equal to human interocular spacing.

5. The camera of claim 1 wherein said retro-reflecting surface is in the central plane of said stereoscopically related images of said subject, and said exposure station is located at a position conjugate with said retro-reflecting surfaces position about said secondary lens means.

6. The camera of claim 5 further comprising a second retro-reflecting surface positioned symmetrically about said semi-transparent reflecting means with respect to said first retro-reflecting surface and oriented to direct light rays, incident thereon from said primary lens made after reflection from said semi-transparent reflecting means, to said exposure station.

7. A camera for making orthoscopic stereo panoramagrams of a photographic subject comprising in combination:
   primary stereo lens means for forming at least one stereo related image of said photographic subject;
   first retro-reflecting surface means for receiving said stereo images and reversing the propagation direction of individual light rays thereof;
   semi-transparent mirror means positioned intermediate said primary stereo lens means and said first retro-reflecting means for reflecting, at least in part, said light rays from said first retro-reflecting surface means toward an exposure station;
   second retro-reflecting surface means oriented for receiving stereo images formed by said primary stereo lens means after reflection by said semi-transparent mirror means, reversing the propagation direction of individual light rays forming said reflected stereo images, directing them toward said exposure station;
   means for supporting stereo recording material at said exposure station; and
   means for regulating the exposure of said stereo recording material.

8. The camera of claim 7 wherein said retro-reflecting means are spaced equal distances from said semi-transparent mirror means.

9. The camera of claim 7 wherein said retro-reflecting means lie in the central plane of the respective stereo images formed by said primary lens means as divided by said semi-transparent mirror.

10. The camera of claim 7 further comprising secondary image-forming means for receiving retro-reflected light rays from said first and second retro-reflecting means after reflection and transmission by said semi-transparent mirror means for refracting said light into a stereoscopic image at said exposure station.

11. The camera of claim 7 wherein said primary and secondary stereo lens means have equal apertures corresponding to human interocular spacing.

12. The camera of claim 10 wherein said primary stereo lens means comprises more than two lenses each associated with an aperture of less than a predetermined size, said lenses being positioned in an array spaced so the total width of said array is equal to said predetermined size.

13. The camera of claim 12 wherein said secondary image-forming means is comprised of a number of lens segments corresponding to the number of lenses in said primary stereo lens means each segment being adjusted to fuse a plurality of images formed by said primary stereo lens means into a single stereo image.

14. The camera of claim 13 wherein said primary stereo lens means and said secondary image-forming means have equal aperture widths at least equal to normal human interocular spacing.

15. A camera for making direct orthoscopic stereo panoramagrams of a given subject comprising:
   primary image-forming means composed of an array of more than two lenses for forming a plurality of stereoscopically related images of said subject said array having a width of predetermined dimension;
   a semi-transparent mirror behind said stereo image-forming means;
   at least one retro-reflecting means for reversing the propagation direction of light rays refracted by said primary image-forming means;
   secondary stereo image-forming means composed of a number of lenses equal to the number of lenses in said primary image-forming means, said lenses in said secondary image-forming means positioned to fuse into a single stereoscopic image said plurality of images reflected by said semi-transparent mirror after they are retro-reflected;
   means for supporting a stereo image recording material behind said secondary image-forming means; and
   means for regulating the exposure of said stereo recording material.

16. The camera of claim 15 wherein said retro-reflecting means is in the central plane of said subject's images formed by said primary image-forming means.

17. The camera of claim 15 wherein said supporting means positions said stereo recording material in the central plane of said fused stereoscopic image.

18. A camera for making a direct orthoscopic stereo panoramagram of a photographic subject at an exposure station comprising, in combination:
   semi-transparent reflecting means for transmitting a first portion of light emanating from said photographic subject and for reflecting a second portion of light emanating from said photographic subject;
   first means positioned for receiving said first portion of light and for reflecting said first portion of light back on itself to said semi-transparent reflecting means whence said semi-transparent reflecting means reflects at least part of said first portion of light to said exposure station; and second means positioned for receiving said second portion of light and for reflecting said second portion of light back on itself to said semi-transparent reflecting means whence said semi-transparent reflecting means transmits at least a part of said second portion of light to said exposure station to reinforce said part of said first portion reaching said exposure station.

19. The camera of claim 18, further comprising:
means for supporting a stereo image-recording material at said exposure station; and
means for regulating the exposure of said stereo recording material.

* * * * *